(12) United States Patent
Vijayaraghavan et al.

(10) Patent No.: US 12,325,059 B2
(45) Date of Patent: Jun. 10, 2025

(54) PROCESS FOR MANUFACTURING TUBELESS VEHICLE WHEEL MADE FROM A SINGLE PIECE INPUT MATERIAL

(71) Applicant: WHEELS INDIA LIMITED, Chennai (IN)

(72) Inventors: Shriram Vijayaraghavan, Chennai (IN); Sundararajan Thiyagarajan, Chennai (IN); Muthuraj Ramasamy, Chennai (IN); Benhambu Kingston, Chennai (IN)

( * ) Notice: Subject to any disclaimer, the term of this patent is extended or adjusted under 35 U.S.C. 154(b) by 0 days.

(21) Appl. No.: 17/261,684

(22) PCT Filed: Aug. 14, 2020

(86) PCT No.: PCT/IB2020/057660
§ 371 (c)(1),
(2) Date: Jan. 20, 2021

(87) PCT Pub. No.: WO2021/074707
PCT Pub. Date: Apr. 22, 2021

(65) Prior Publication Data
US 2022/0297178 A1   Sep. 22, 2022

(30) Foreign Application Priority Data
Oct. 17, 2019   (IN) .............................. 201941042042

(51) Int. Cl.
*B21D 53/30*   (2006.01)
*B21D 22/14*   (2006.01)
(Continued)

(52) U.S. Cl.
CPC ............. *B21D 53/30* (2013.01); *B21D 22/14* (2013.01); *B60B 3/00* (2013.01); *B60B 21/023* (2013.01);
(Continued)

(58) Field of Classification Search
CPC ...... B21D 53/30; B21D 53/264; B21D 22/14; B60B 3/00; B60B 3/02; B60B 3/002;
(Continued)

(56) References Cited

U.S. PATENT DOCUMENTS

| 5,832,608 | A  | * | 11/1998 | Pollkotter | .............. | B21D 53/30 |
|   |   |   |   |   |   | 72/85 |
| 2009/0278399 | A1 | * | 11/2009 | Srivats | ................. | B21D 53/264 |
|   |   |   |   |   |   | 301/95.101 |
| 2017/0232498 | A1 | * | 8/2017 | Zhang | .................... | B21D 22/14 |
|   |   |   |   |   |   | 29/894.353 |

FOREIGN PATENT DOCUMENTS

| CN | 101269456 | A | * | 9/2008 |
| CN | 201220572 | Y | * | 4/2009 |

(Continued)

*Primary Examiner* — Bayan Salone

(57) ABSTRACT

The present invention explains a process for manufacturing tubeless vehicle wheel without welding using a hoop 100 having an outboard end 101, a centre region 102, an inboard end 103. The process includes spinning the outboard end 101 to obtain a disc region 202, spinning disc end 203 to obtain preform nave region 301. Forming the disc region 202 to obtain a disc profile 401 and a nave region 403, forming the centre region 102, inboard end 103 to obtain a straight rim profile 402. Spinning and forming outer end 405 of the straight rim profile 402 to obtain an outboard flange 502*a* and spinning the straight rim profile 402 to obtain a concave rim profile 601*a* with a preform inboard flange 602*a*. Spinning the concave rim profile 601*a* to obtain bead seats 701*a*, well region 703*a* and, forming the preform inboard flange 602*a* to obtain an inboard flange 704*a*.

4 Claims, 15 Drawing Sheets

(51) Int. Cl.
  *B60B 3/00*     (2006.01)
  *B60B 21/02*    (2006.01)
  *B60B 21/10*    (2006.01)

(52) U.S. Cl.
  CPC ........... *B60B 21/102* (2013.01); *B60B 21/104* (2013.01); *B60B 2310/20* (2013.01)

(58) Field of Classification Search
  CPC ... B60B 21/023; B60B 21/102; B60B 21/104; B60B 21/028; B60B 21/026; B60B 2310/20; B60B 2310/211; B60B 2310/206; B60B 2310/208; B60B 2900/311
  See application file for complete search history.

(56) References Cited

FOREIGN PATENT DOCUMENTS

| | | | | |
|---|---|---|---|---|
| GB | 2005065 A | * | 4/1979 | .............. H01J 37/04 |
| WO | WO-2019048939 A1 | * | 3/2019 | .............. B21D 22/14 |

* cited by examiner

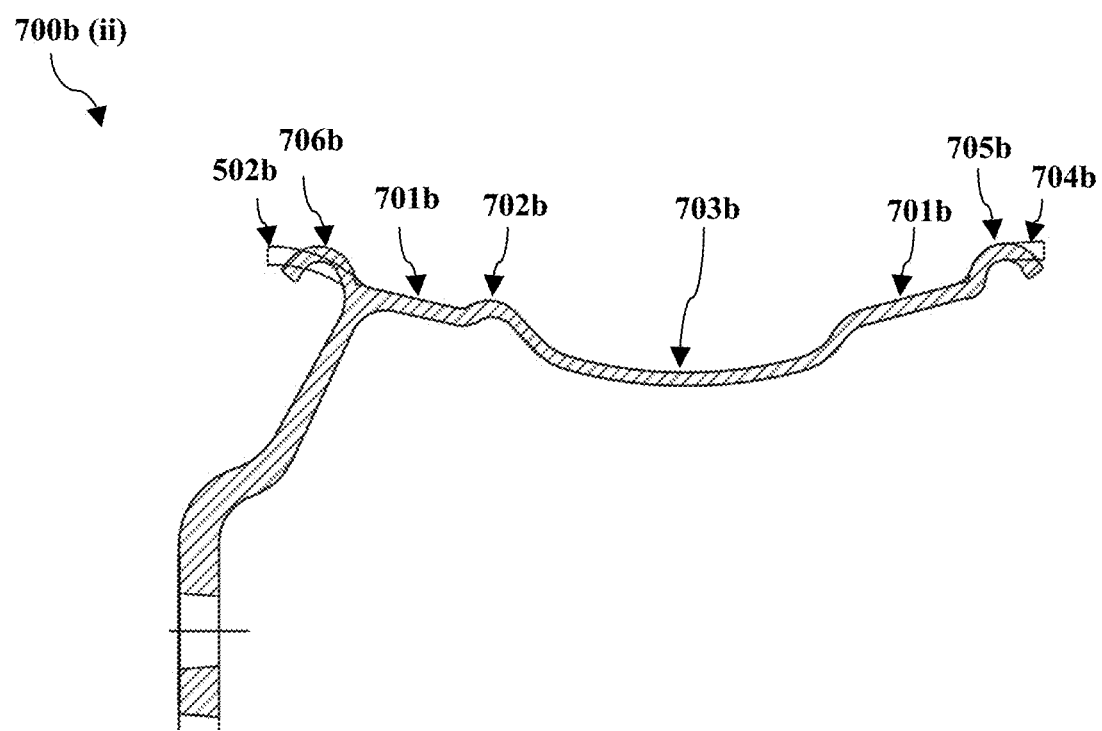
Fig. 7b (ii)

PROCESS FOR MANUFACTURING TUBELESS VEHICLE WHEEL MADE FROM A SINGLE PIECE INPUT MATERIAL

FIELD OF INVENTION

The embodiment herein generally relates to the field of manufacturing a tubeless vehicle wheel without welding. More specifically, the embodiment provides a process for manufacturing tubeless vehicle wheel without welding using a hoop.

BACKGROUND AND PRIOR ART

In general, various methods are followed for manufacturing a wheel for a vehicle. The wheels can be made by assembling a multi piece wheel or the wheels can be manufactured using a single piece. Multi piece wheel manufacturing process involves a central disc of the wheel and a wheel rim formed separately. Further, the central disc and wheel rim have to be assembled accordingly and welded together as a final wheel for a vehicle. In case of a single piece wheel manufacturing process, the whole wheel is formed using a single blank.

Generally, raw material consumption is low in a single piece wheel manufacturing process when compared to a multi piece wheel manufacturing process. Further, stress concentration due to welding is eliminated in a single piece wheel manufacturing process as welding process is not required. In addition, the production cost for manufacturing a single wheel is lower when compared to manufacturing a multi piece wheel.

The Indian patent 302402 discloses a method for manufacturing a single piece vehicle wheel. The method includes a welding process for manufacturing the single piece wheel. However, the patent does not disclose a method for manufacturing a single piece tubeless vehicle wheel. Further, the patent does not disclose a method for manufacturing a single piece tubeless vehicle wheel without welding.

Therefore, there is a need to develop a process for manufacturing tubeless vehicle wheel. Further, there is a need for a process for manufacturing tubeless vehicle wheel without welding using a single hoop. Furthermore, there is a need for a process for manufacturing tubeless vehicle wheel without subjecting the work piece to more stress and tension.

Objects of the Invention

Some of the objects of the present disclosure are described herein below:

A main object of the present invention is to provide a process for manufacturing tubeless vehicle wheel without welding.

Another object of the present invention is to provide a process for manufacturing a tubeless vehicle wheel using a single hoop as a work piece.

Yet another object of the present invention is to provide a process for manufacturing a tubeless vehicle wheel using simple methods.

Still another object of the present invention is to provide a process for manufacturing a tubeless vehicle wheel at low cost.

The other objects and advantages of the present invention will be apparent from the following description when read in conjunction with the accompanying drawings, which are incorporated for illustration of preferred embodiments of the present invention and are not intended to limit the scope thereof.

SUMMARY OF THE INVENTION

In view of the foregoing, an embodiment herein provides a process for manufacturing tubeless vehicle wheel without welding using a hoop as a work piece. The process for manufacturing the tubeless wheel includes providing a hoop having an outboard end, a centre region and an inboard end made of metallic materials. Spinning the outboard end of the hoop to obtain a disc region, then spinning disc end of the disc region to obtain a preform nave region. A forming process is performed on the disc region to obtain a disc profile and a nave region and a forming process is performed on the centre region, inboard end of the hoop to obtain a straight rim profile. Spinning is performed on the outer end of the straight rim profile, and then forming is performed to obtain an outboard flange. Next, spinning is performed on the straight rim profile to obtain a concave rim profile with a preform inboard flange. A spinning process is performed on the concave rim profile to obtain bead seats, and a well region. A forming process is performed on the preform inboard flange to obtain an inboard flange. A plurality of vent holes is provided at the disc profile and a valve hole is provided at the bead seat.

In accordance with an embodiment, a plurality of bolt holes is provided at the nave region. In an embodiment, the plurality of bolt holes is obtained using a punching process.

In accordance with an embodiment, the outboard flange and the inboard flange are obtained using a press forming process.

In accordance with an embodiment, the vent holes and the valve hole are obtained using a punching process.

In accordance with an embodiment, the disc profile, nave region and the straight rim profile are obtained using a flow forming process.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 7b (ii) illustrates sectional view of hoop after spinning process of concave rim profile 700b (ii), according to a second embodiment herein;

LIST OF NUMERALS

Figure 1:
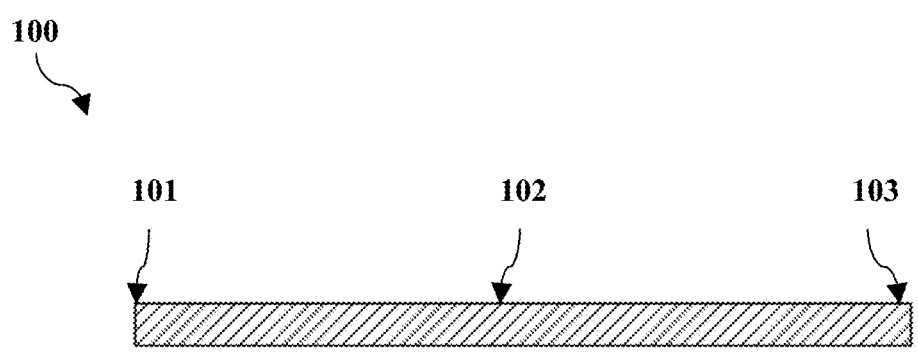
FIG. 1 illustrates a sectional view of hoop 100, according to an embodiment herein.

- 100—Sectional view of hoop
- 101—Outboard end
- 102—Centre region
- 103—Inboard end
- 200—Sectional view of hoop after spinning process of outboard end
- 202—Disc region
- 203—Disc end
- 300—Sectional view of hoop after spinning process of disc end
- 301—Preform nave region
- 400—Sectional view of hoop after forming process of disc region, centre region
- 401—Disc profile
- 402—Straight rim profile
- 403—Nave region
- 404—Bolt holes
- 405—Outer end of straight rim profile
- 501—Extended outer end
- 502a—Outboard flange
- 502b—Preform outboard flange
- 601a, 601b—Concave rim profile
- 602a, 602b—Preform inboard flange
- 701a, 701b, 701c—Bead seats
- 703a, 703b, 703c—Well region
- 704a, 704b, 704c—Inboard flange
- 705b, 705c—Extended inboard flange
- 706b—Outboard flange
- 800a, 800b, 800c—Sectional view of tubeless wheel
- 801a, 801b, 802c—Vent holes
- 802a, 802b, 802c—Valve hole

DETAILED DESCRIPTION OF THE PREFERRED EMBODIMENTS

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need for a process for manufacturing tubeless vehicle wheel without welding. The embodiments herein achieve this by providing a process for manufacturing tubeless vehicle wheel without welding using a hoop. Referring now to the drawings, and more particularly to FIGS. 1 through 8, where similar reference characters denote corresponding features consistently throughout the figures, there are shown preferred embodiments.

FIG. 1 illustrates a sectional view of a hoop 100. The hoop 100 has an outboard end 101, a centre region 102 and an inboard end 103.

Figure 2:
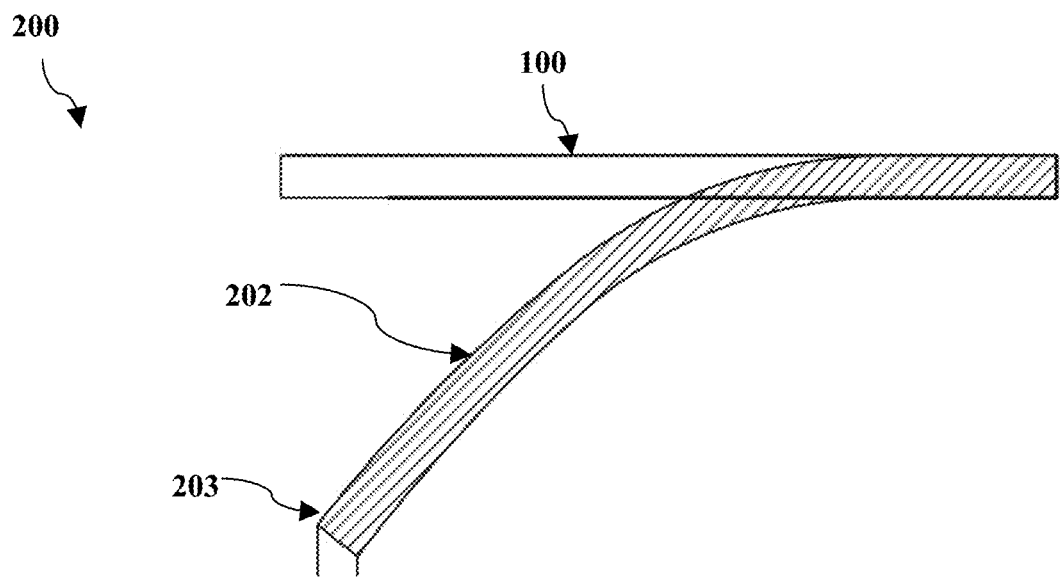
FIG. 2 illustrates sectional view of hoop after spinning process of outboard end of hoop 200, according to an embodiment herein.

FIG. 2 illustrates sectional view of hoop 200 after spinning process of outboard end of hoop 101, according to an embodiment. A spinning process is performed on the outboard end 101 of the hoop 100 for obtaining a disc region 202 with a disc end 203. The size of the disc region can be formed according to requirement.

Figure 3:
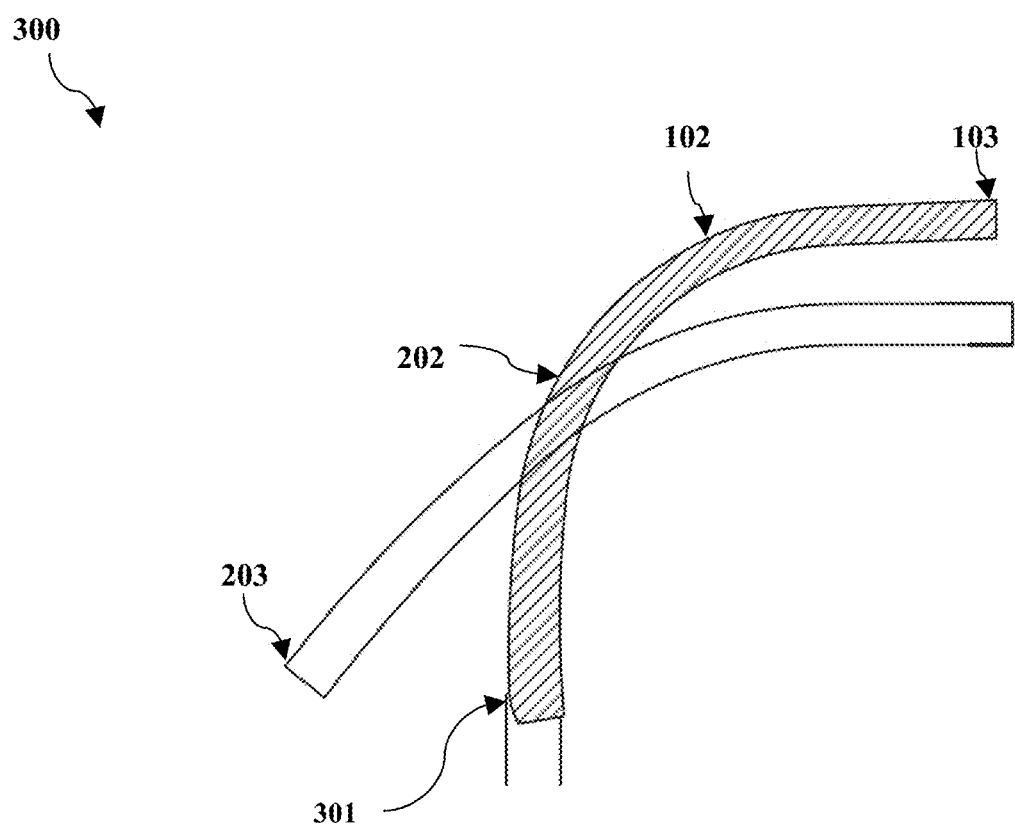
FIG. 3 illustrates sectional view of hoop after spinning process of disc end of disc region 300, according to an embodiment herein.

FIG. 3 illustrates a sectional view of hoop 300 after spinning process of disc end 203 of disc region 202, according to an embodiment. A spinning process is performed on the disc end 203 of the disc region 202 for obtaining a preform nave region 301.

Figure 4:
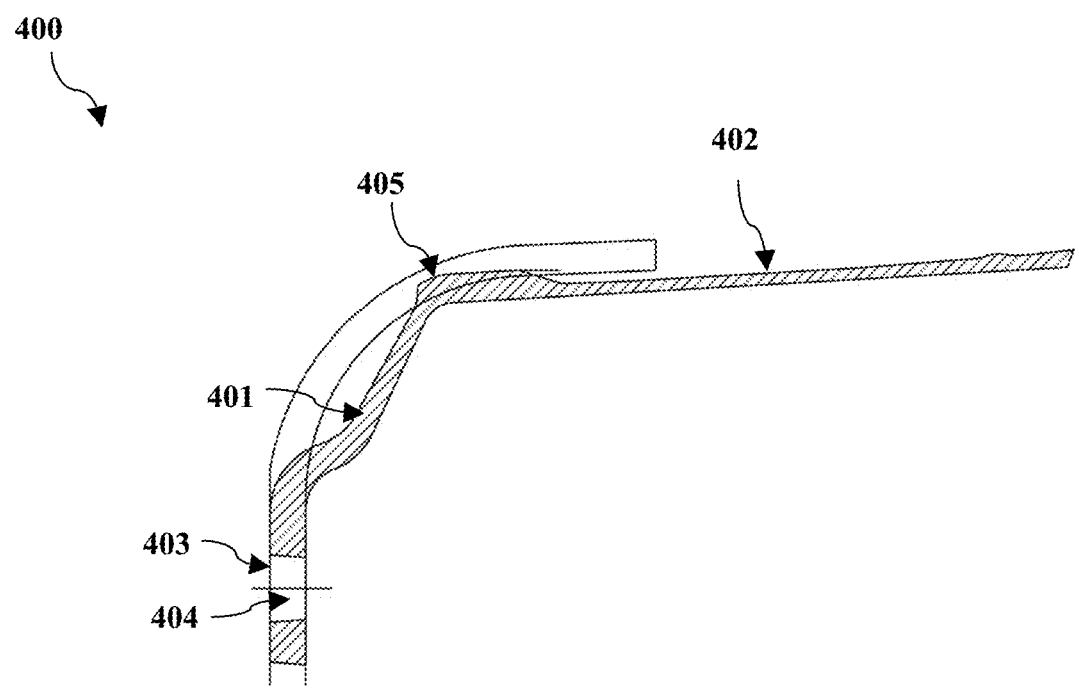
FIG. 4 illustrates sectional view of hoop after forming process of disc region and centre region 400, according to an embodiment herein.

FIG. 4 illustrates sectional view of hoop 400 after forming process of disc region 202 and centre region 102, according to an embodiment. A forming process is performed on the disc region 202 for obtaining a disc profile 401 and a nave region 403. A forming process is performed on the centre region 102 and the inboard end 103 for obtaining a straight rim profile 402. The straight rim profile 402 includes an outer end 405. A plurality of bolt holes 404 is provided on the nave region 403. In an embodiment, the plurality of bolt holes 404 is obtained using a punching process. In an embodiment, a flow forming process is performed on the disc region 202 for obtaining a disc profile 401 and a nave region 403 and a flow forming process is performed on the centre region 102 and the inboard end 103 for obtaining a straight rim profile 402.

Figure 5A:
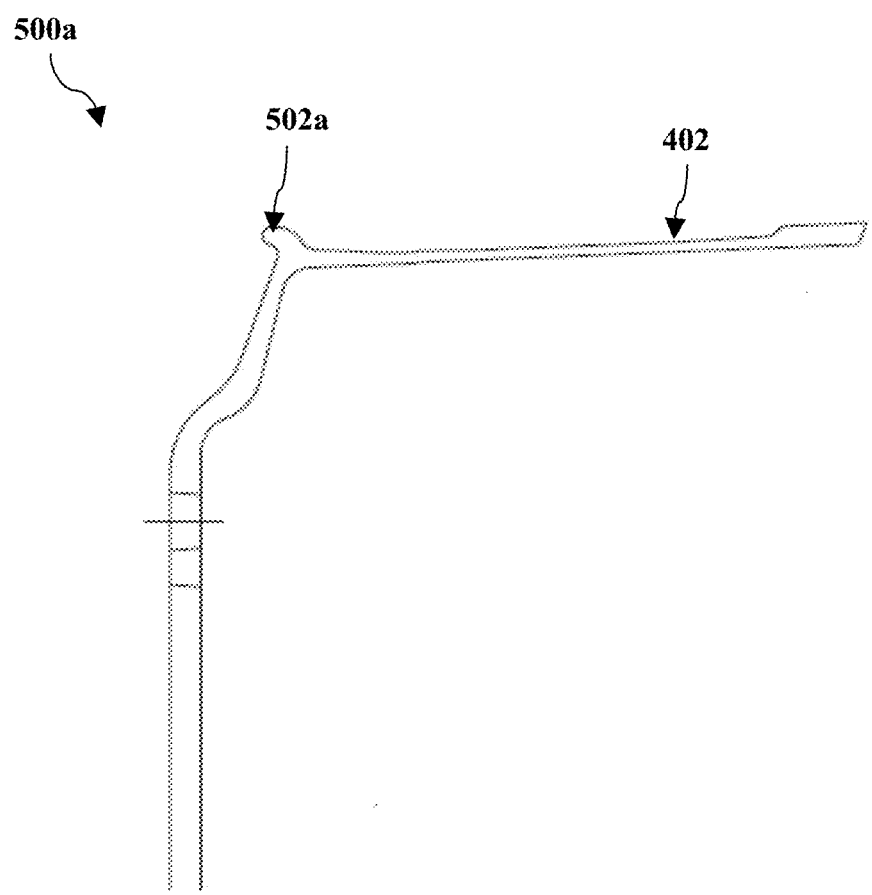
FIG. 5a illustrates sectional view of hoop 500a after spinning process of outer end of straight rim profile, according to a first embodiment herein.

FIG. 5a illustrates a sectional view of hoop 500a after spinning process of outer end 405 of straight rim profile 402, according to a first embodiment. A spinning process and a forming process are performed on the outer end 405 of the straight rim profile 402 for obtaining an outboard flange 502a.

In an embodiment, a press forming process is performed on the outer end 405 of the straight rim profile 402 for obtaining an outboard flange 502a.

Figure 5B:
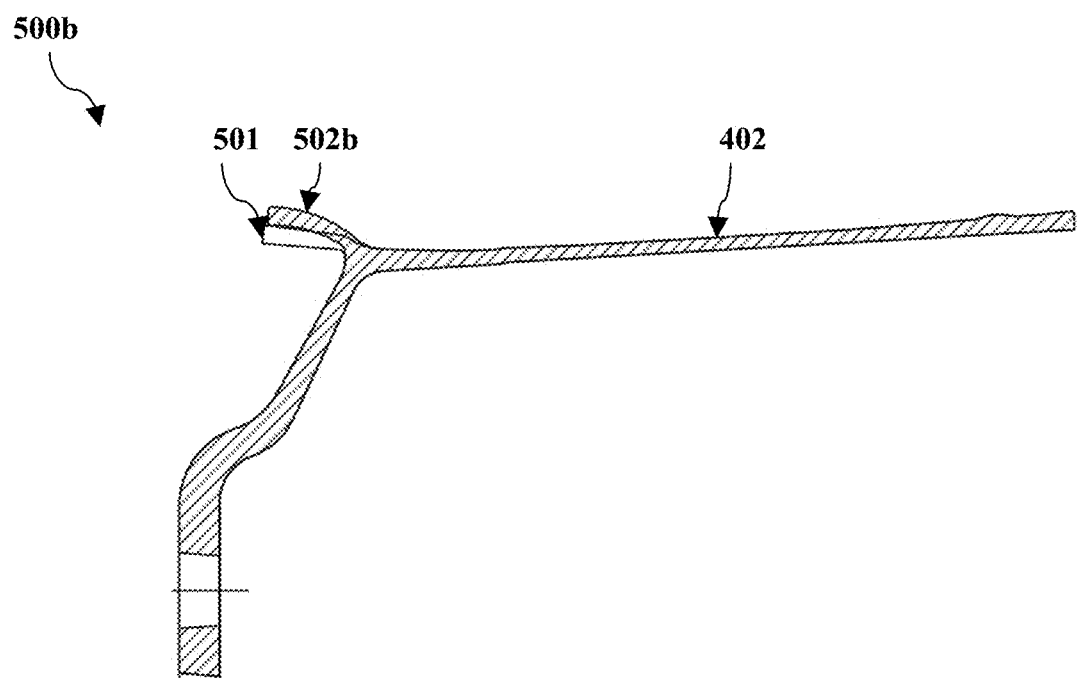
FIG. 5b illustrates sectional view of hoop 500b after spinning process of outer end of straight rim profile, according to a second embodiment herein.

FIG. 5b illustrates a sectional view of hoop 500b after spinning process of outer end 405 of straight rim profile 402a, according to a second embodiment. A spinning process and a forming process are performed on the outer end 405 of the straight rim profile 402a for obtaining an extended outer end 501. Next, a spinning process is performed on the extended outer end 501 of the straight rim profile 402a for obtaining a preform outboard flange 502b.

Figure 6A:
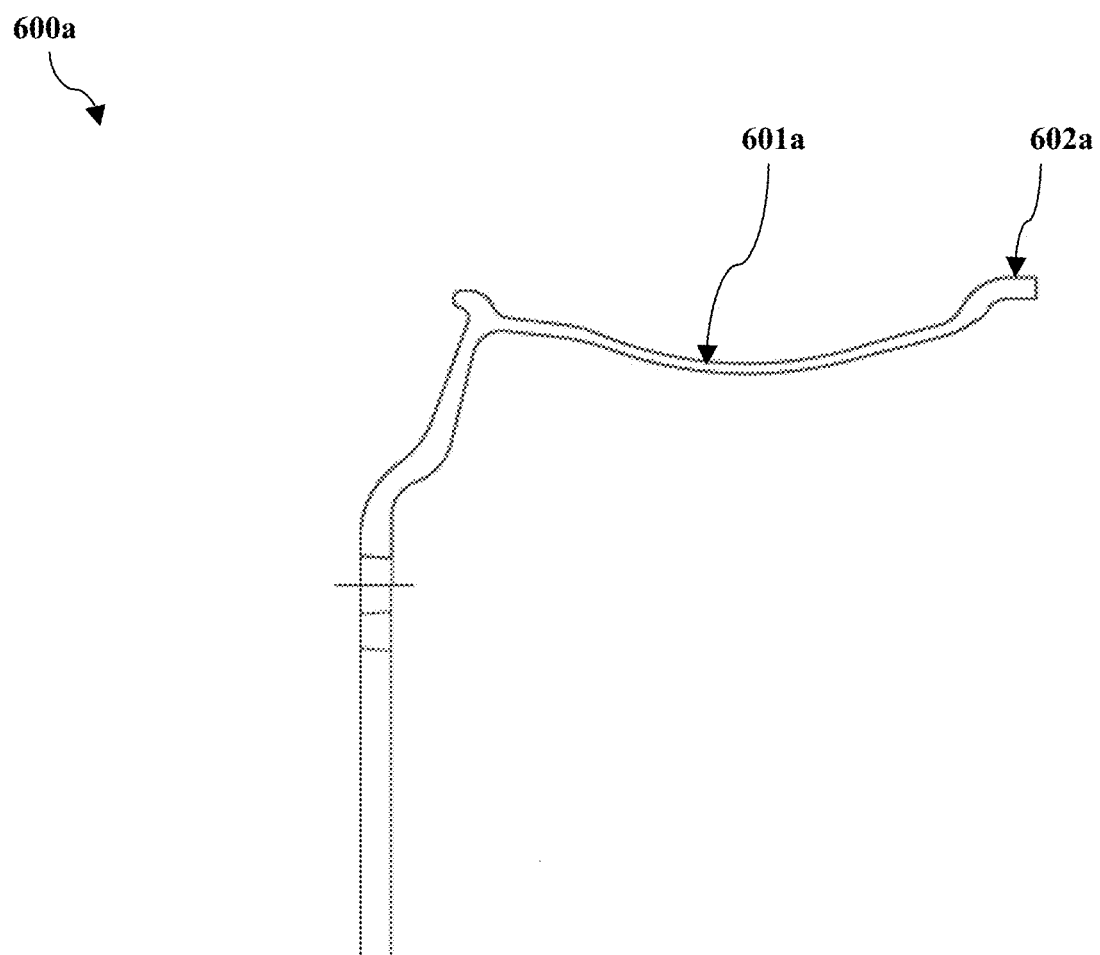
FIG. 6a illustrates sectional view of hoop 600a after spinning process of straight rim profile, according to a first embodiment herein.

FIG. 6a illustrates a sectional view of hoop 600a after spinning process of straight rim profile 402a, according to a first embodiment. A spinning process is performed on the straight rim profile 402a for obtaining a concave rim profile 601a and a preform inboard flange 602a.

Figure 6B:
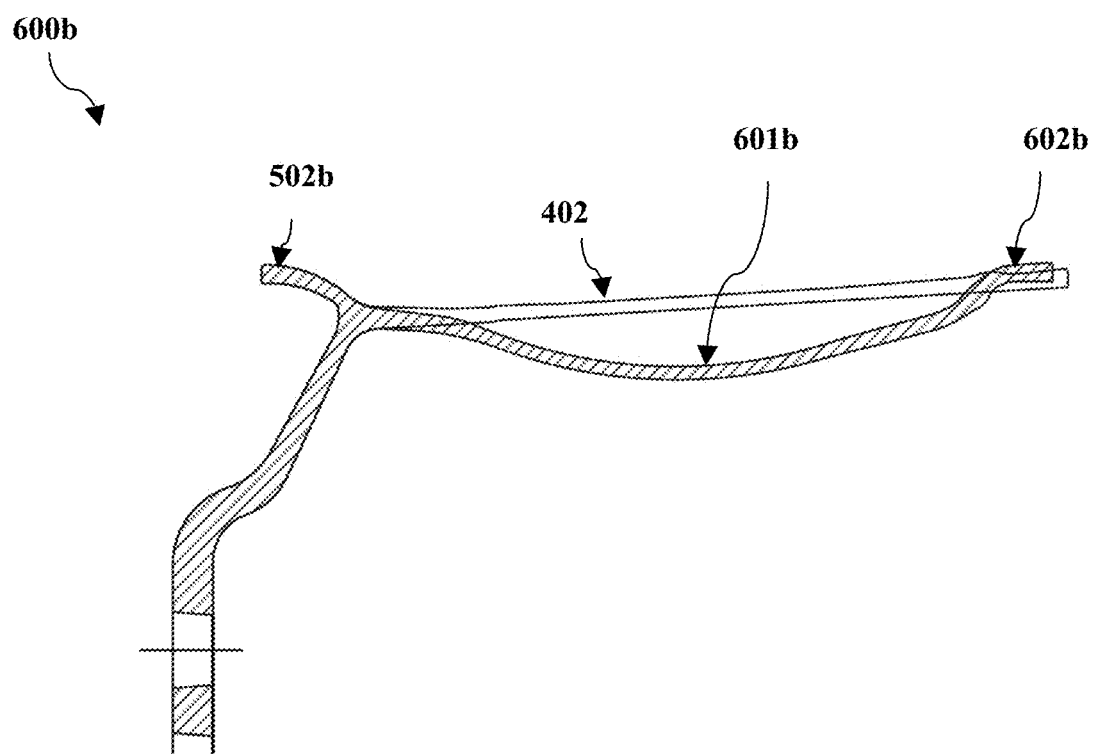
FIG. 6b illustrates sectional view of hoop 600b after spinning process of straight rim profile, according to a second embodiment herein.

FIG. 6b illustrates a sectional view of hoop 600b after spinning process of straight rim profile 402b, according to a second embodiment. A spinning process is performed on the straight rim profile 402b for obtaining a concave rim profile 601b and a preform inboard flange 602b.

Figure 7A:
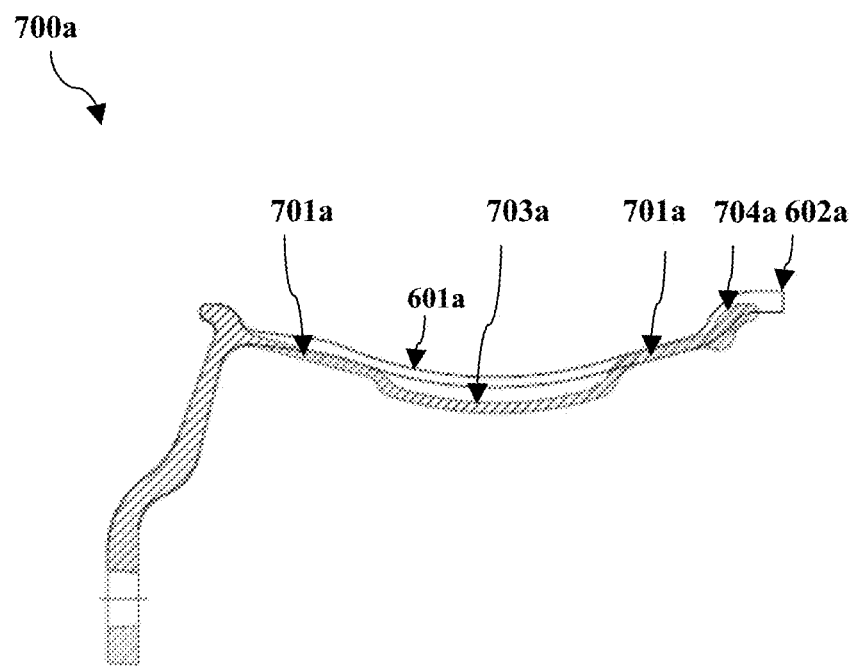
FIG. 7a illustrates sectional view of hoop after spinning process of concave rim profile 700a, according to a first embodiment herein.

FIG. 7a illustrates sectional view of hoop 700a after spinning process of concave rim profile 601a, according to a first embodiment. The spinning process is performed on the concave rim profile for obtaining bead seats 701a, and a well region 703a. A forming process is performed on the preform inboard flange 602a for obtaining an inboard flange 704a. The bead seats 701a include an outboard bead seat 701a and an inboard bead seat 701a.

In an embodiment, a press forming process is performed on the preform inboard flange 602a for obtaining an inboard flange 704a.

Figure 7B:
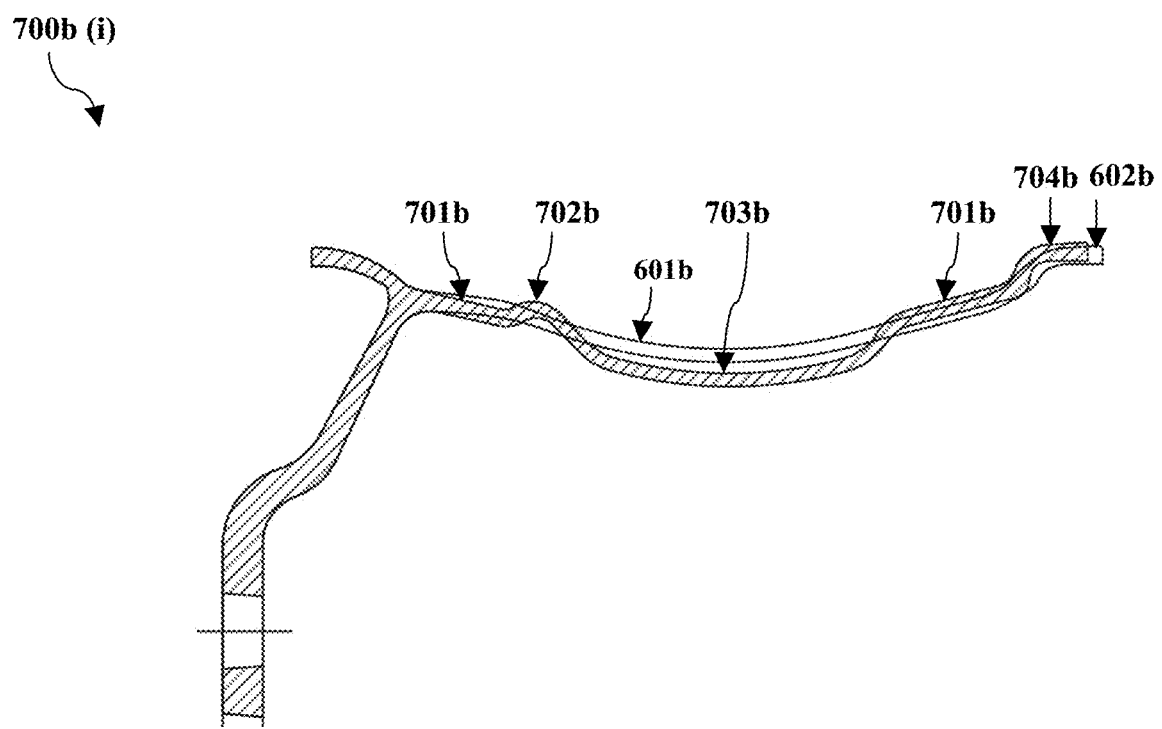
FIG. 7b (i) illustrates sectional view of hoop after spinning process of concave rim profile 700b (i), according to a second embodiment herein.

FIG. 7b (i) illustrates a sectional view of hoop 700b (i) after spinning process of concave rim profile 601b, according to a second embodiment. The spinning process is performed on the concave rim profile 601b for obtaining bead seats 701b, a hump 702b and a well region 703b. A forming process is performed on the preform inboard flange 602a for obtaining an inboard flange 704b. The bead seats 701b include an outboard bead seat 701b and an inboard bead seat 701b.

FIG. 7b (ii) illustrates a sectional view of hoop 700b (ii) after forming process, according to a second embodiment. The forming process is performed on the preform outboard flange 502b for obtaining an outboard flange 706b. A forming process is performed on the inboard flange 704b for obtaining an extended inboard flange 705b.

In an embodiment, a press forming process is performed on the preform outboard flange 502b for obtaining an outboard flange 706b and a press forming process is performed on the inboard flange 704b for obtaining an extended inboard flange 705b.

Figure 7C:
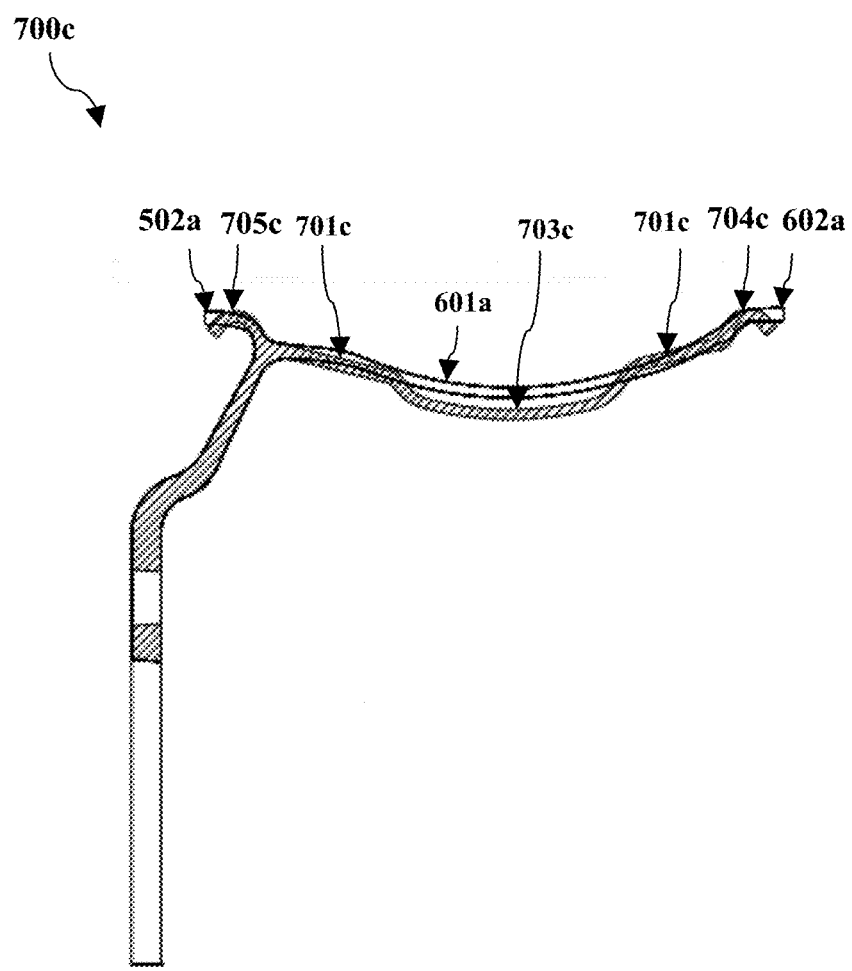
FIG. 7c illustrates sectional view of hoop after spinning process of concave rim profile 700c, according to a third embodiment herein.

FIG. 7c illustrates sectional view of hoop 700c after spinning process of concave rim profile 601a, according to a third embodiment. The spinning process is performed on the concave rim profile 601a for obtaining bead seats 701c, and a well region 703c. A forming process is performed on the preform inboard flange 602a for obtaining an inboard flange 704c. A forming process is further performed on the outboard flange 502a for obtaining an extended outboard flange 705c. The bead seats 701c include an outboard bead seat 701c and an inboard bead seat 701c.

Figure 8A:
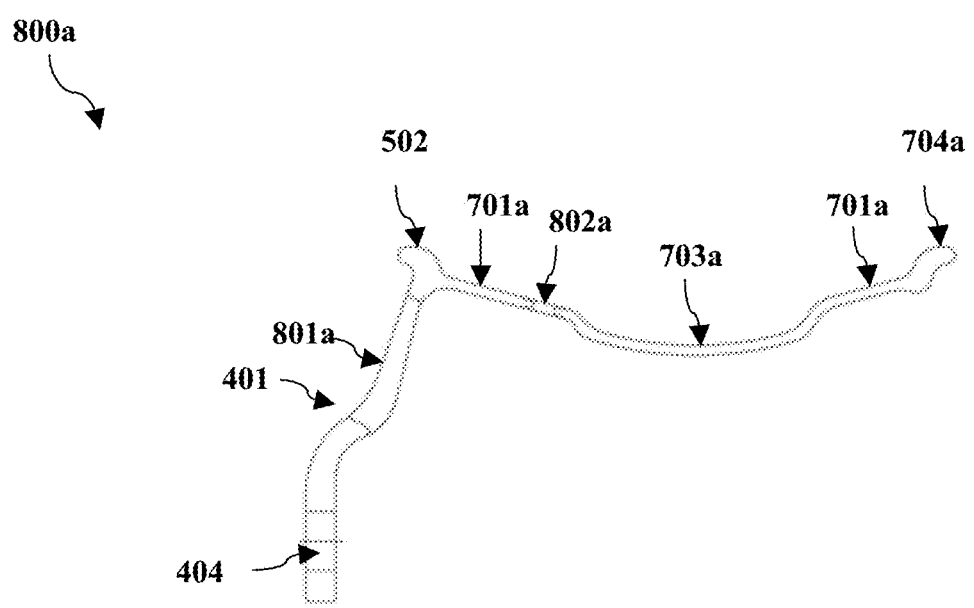
FIG. 8a illustrates sectional view of tubeless wheel with vent holes and valve hole 800a, according to a first embodiment herein.

FIG. 8a illustrates a sectional view of tubeless wheel 800a with vent holes 801a and valve hole 802a, according to a first embodiment. A plurality of vent holes 801a is provided on the disc profile 401 and a valve hole 802a is provided on the outboard bead seat 701a. In an embodiment, the plurality of vent holes 801a on the disc profile 401 and a valve hole 802a on the outboard bead seat 701a is obtained using a punching process.

Figure 8B:
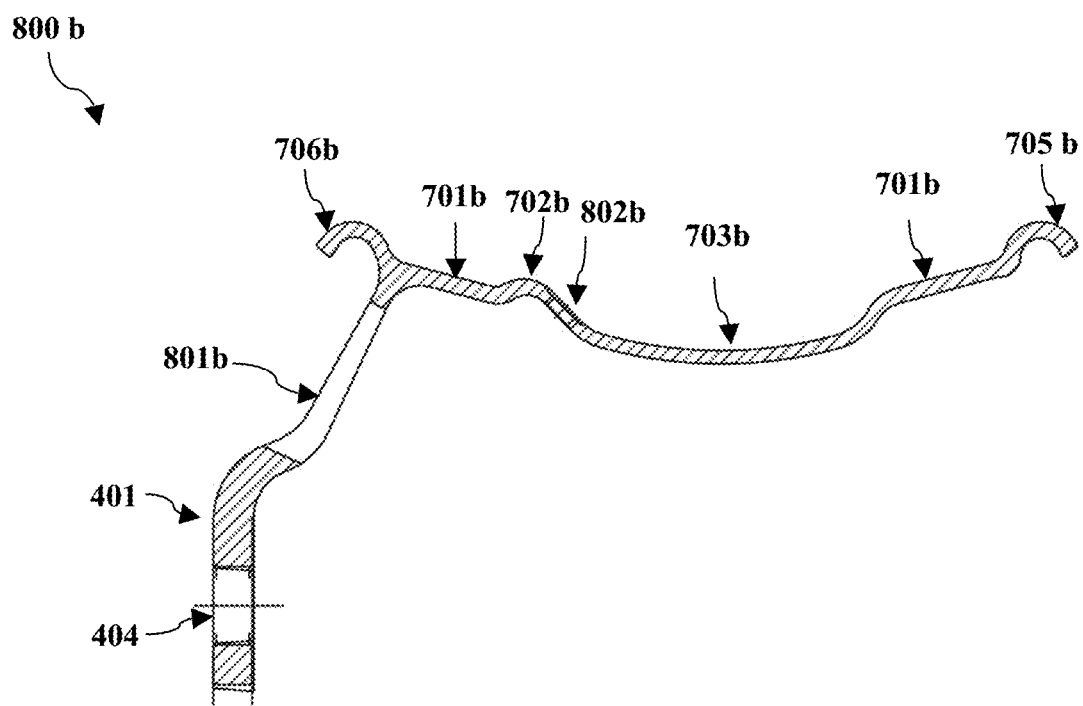
FIG. 8b illustrates sectional view of tubeless wheel with vent holes and valve hole 800b, according to a second embodiment herein.

FIG. 8b illustrates a sectional view of tubeless wheel 800b with vent holes 801b and valve hole 802b, according to a second embodiment. A plurality of vent holes 801b is provided on the disc profile 401 and a valve hole 802b is provided on outboard side of the well region 703b. In an embodiment, the plurality of vent holes 801b on the disc profile 401 and a valve hole 802b is obtained using a punching process.

Figure 8C:
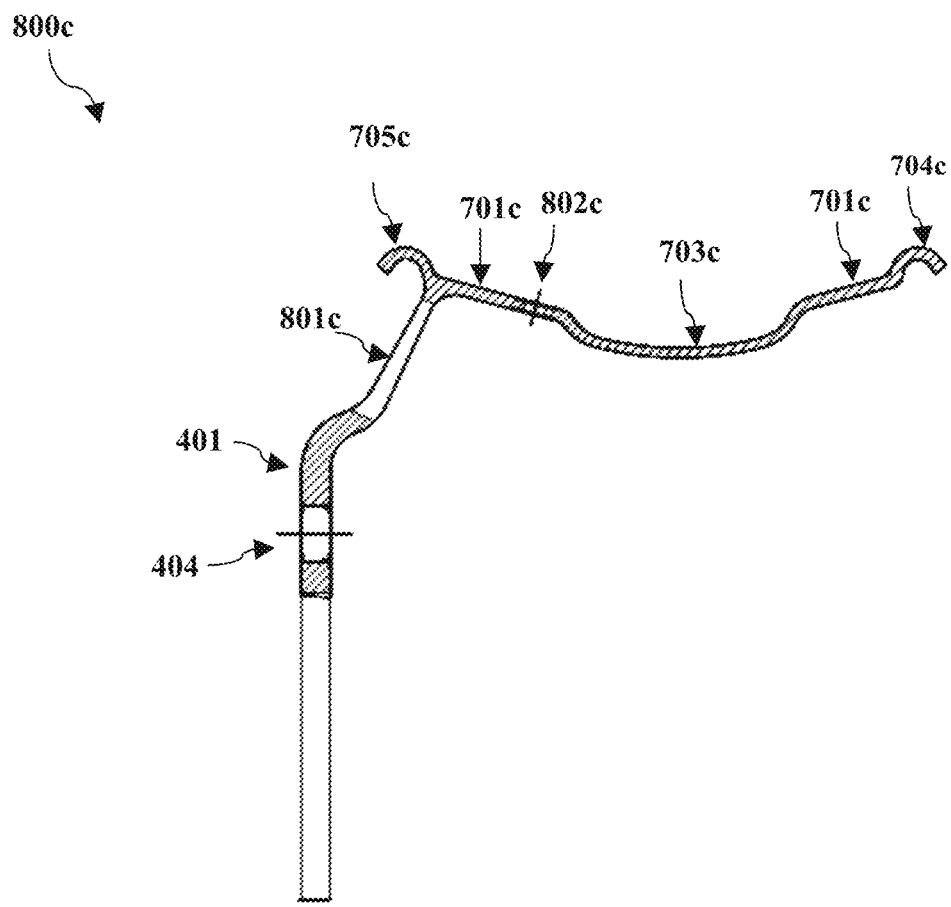
FIG. 8c illustrates sectional view of tubeless wheel with vent holes and valve hole 800c, according to a third embodiment herein.

FIG. 8c illustrates a sectional view of tubeless wheel 800c with vent holes 801c and valve hole 802c, according to a third embodiment. A plurality of vent holes 801c is provided on the disc profile 401 and a valve hole 802c is provided on the outboard bead seat 701c. In an embodiment, the plurality of vent holes 801c on the disc profile 401 and a valve hole 802c on the outboard bead seat 701c is obtained using a punching process.

A main advantage of the present invention is that it provides a process for manufacturing a single piece tubeless vehicle wheel.

Another advantage of the present invention is that the process uses a single hoop for manufacturing tubeless vehicle wheel.

Yet another advantage of the present invention is that the process for manufacturing a single piece tubeless vehicle wheel uses simple methods.

Still another advantage of the present invention is that the process for manufacturing a tubeless vehicle wheel eliminates stress concentration due to welding.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A process for manufacturing tubeless vehicle wheel without welding comprising the steps of;
   providing a hoop (100) made of metallic materials having an outboard end (101), a centre region (102) and an inboard end (103);
   spinning the outboard end (101) of the hoop (100) to obtain a disc region (202);
   spinning disc end (203) of the disc region (202) to obtain a preform nave region (301);
   forming the disc region (202) to obtain a disc profile (401) and a nave region (403) and forming the centre region (102) and inboard end (103) of the hoop (100) to obtain a straight rim profile (402);
   spinning and forming outer end (405) of the straight rim profile (402) to obtain an outboard flange (502a);
   spinning the straight rim profile (402) to obtain a concave rim profile (601a) with a preform inboard flange (602a);
   spinning the concave rim profile (601a) to obtain bead seats (701a) and a well region (703a);
   forming the preform inboard flange (602a) to obtain an inboard flange (704a);
   providing a plurality of vent holes (801a) at the disc profile (401a) and a valve hole (802a) at the bead seat (701a);

wherein the forming of the outboard flange (502*a*) and the inboard flange (704*a*) includes using a press forming process; and wherein the disc profile (401), nave region (403) and the straight rim profile (402) obtained using a flow forming process.

2. The process as claimed in claim 1, wherein a plurality of bolt holes (404) is provided at the nave region (403).

3. The process as claimed in claim 2, wherein the plurality of bolt holes (404) are obtained using a punching process.

4. The process as claimed in claim 1, wherein vent holes (801*a*) and the valve hole (802*a*) are obtained using a punching process.

* * * * *